(12) United States Patent
Fredlund et al.

(10) Patent No.: US 7,139,027 B1
(45) Date of Patent: Nov. 21, 2006

(54) CAMERA HAVING REMOVABLE DISPLAY PROVIDED ON AN IMAGE BEARING MEDIUM

(75) Inventors: John R. Fredlund, Rochester, NY (US); Raymond E. Wess, Holley, NY (US)

(73) Assignee: Eastman Kodak Company, Rochester, NY (US)

( * ) Notice: Subject to any disclaimer, the term of this patent is extended or adjusted under 35 U.S.C. 154(b) by 748 days.

(21) Appl. No.: 09/669,178

(22) Filed: Sep. 25, 2000

(51) Int. Cl.
*H04N 5/222* (2006.01)

(52) U.S. Cl. .............................. 348/333.07; 348/231.7

(58) Field of Classification Search ........... 348/333.01, 348/333.07, 373–376, 333.1–333.7; 396/374, 396/296; 345/97, 98; 349/1, 168, 177, 179
See application file for complete search history.

(56) References Cited

U.S. PATENT DOCUMENTS

| | | | | |
|---|---|---|---|---|
| 4,420,773 A | * | 12/1983 | Toyoda et al. | 348/231.1 |
| 4,471,382 A | * | 9/1984 | Toyoda et al. | 348/239 |
| 4,887,161 A | * | 12/1989 | Watanabe et al. | 348/231.7 |
| 5,417,883 A | * | 5/1995 | Epstein et al. | 252/299.01 |
| 5,508,720 A | * | 4/1996 | DiSanto et al. | 345/169 |
| 5,695,682 A | * | 12/1997 | Doane et al. | 252/299.01 |
| 5,933,206 A | * | 8/1999 | Niibori et al. | 349/60 |
| 6,262,697 B1 | * | 7/2001 | Stephenson | 345/43 |
| 6,320,573 B1 | * | 11/2001 | Stephenson | 396/205 |
| 6,411,282 B1 | * | 6/2002 | Ishizawa et al. | 345/169 |
| 6,587,140 B1 | * | 7/2003 | No | 348/333.02 |
| 6,628,333 B1 | * | 9/2003 | Gowda et al. | 348/333.11 |
| 6,724,427 B1 | * | 4/2004 | Fredlund et al. | 348/333.07 |
| 2003/0038880 A1 | * | 2/2003 | No | 348/207.1 |

OTHER PUBLICATIONS

Hashimoto et al, Reflective Color Display Using Cholesteric Liquid Crystals, SID 98 Digest, Article 31.1, pp. 897-900.

* cited by examiner

Primary Examiner—Vivek Srivastava
Assistant Examiner—Gevell Selby
(74) Attorney, Agent, or Firm—Raymond L. Owens

(57) ABSTRACT

A camera having a removable image bearing medium for camera captured images that includes film or a digital memory includes a display disposed relative to the removable image bearing medium so that the display is removable from the camera with the removable image bearing medium, such display displaying images for information related to captured images. The display is actuated to provide images of one or more captured images or information related to such one or more captured images; and the display being positioned for viewing by a user.

10 Claims, 10 Drawing Sheets

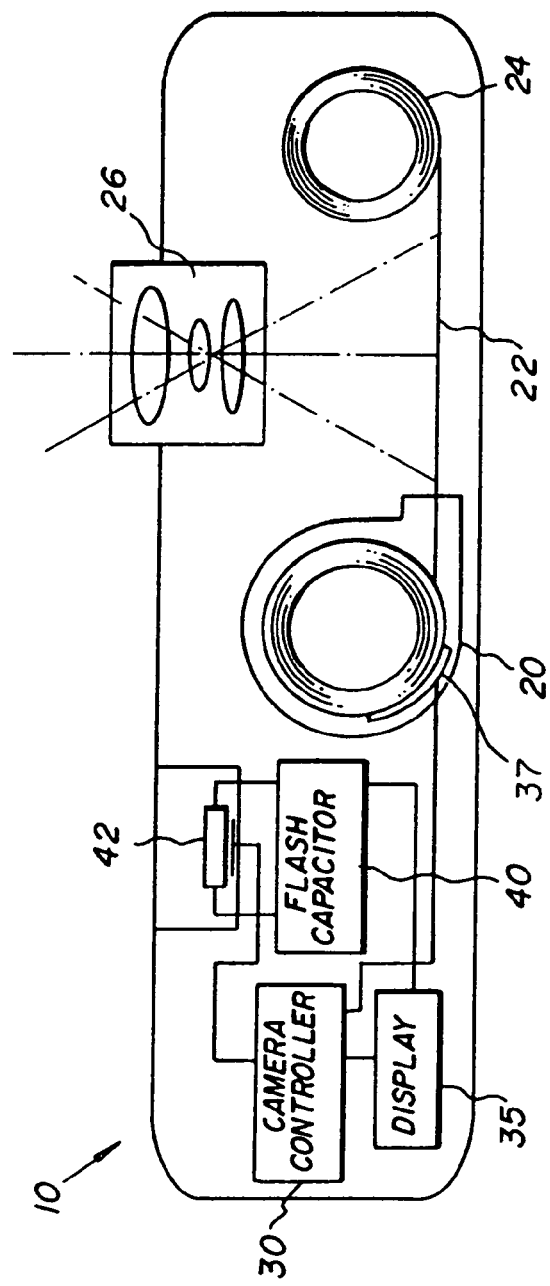
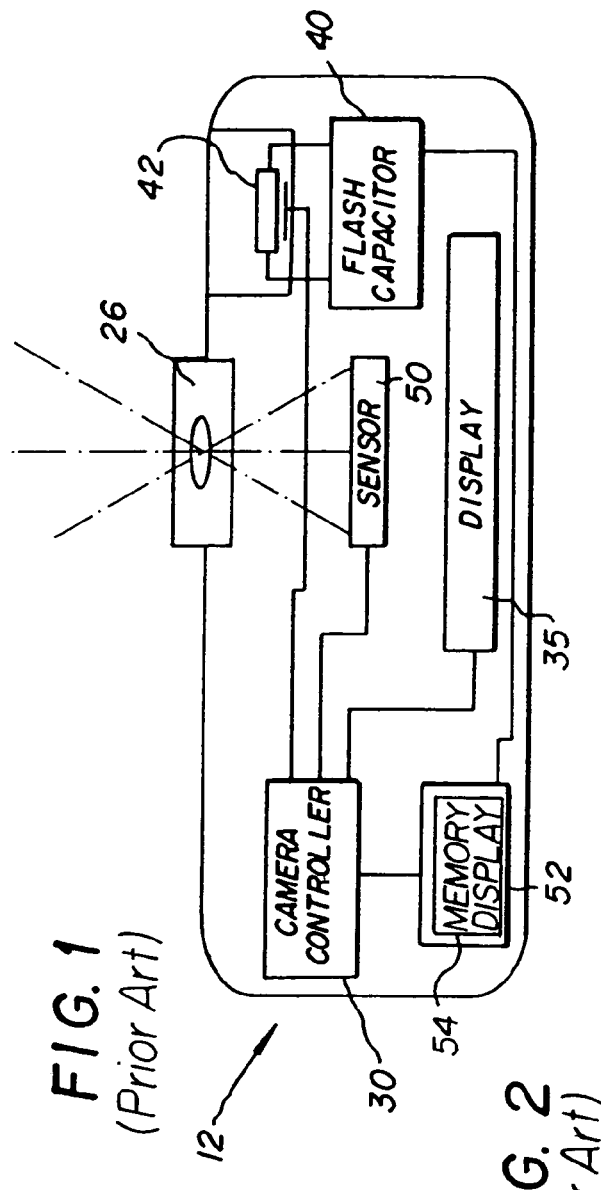
FIG. 1 (Prior Art)
FIG. 2 (Prior Art)

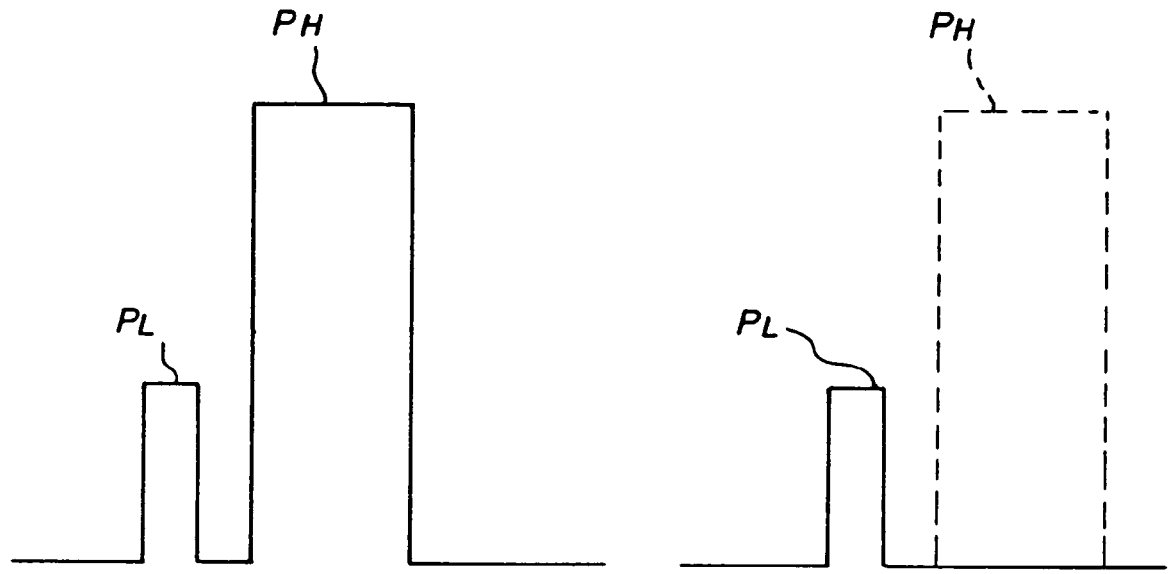
FIG. 8A
(Prior Art)
FIG. 8B
(Prior Art)
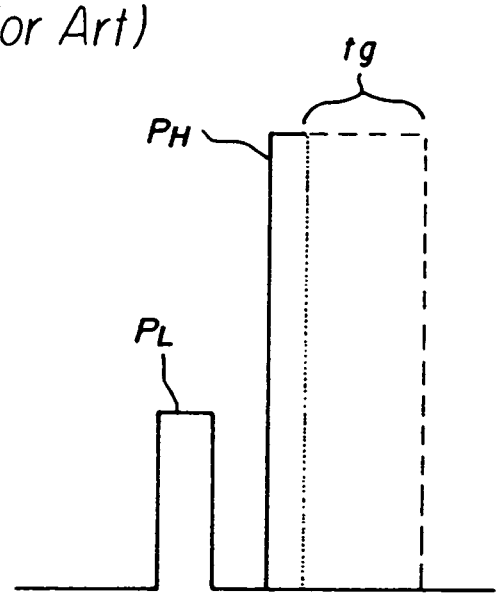
FIG. 8C
(Prior Art)

CAMERA HAVING REMOVABLE DISPLAY PROVIDED ON AN IMAGE BEARING MEDIUM

FIELD OF THE INVENTION

The present invention relates to cameras having removable image bearing media.

BACKGROUND OF THE INVENTION

Current silver halide film cameras have displays for indicating settings and status conditions, such as frame number, of the camera. Often, the display uses twisted nematic liquid crystals that that requires continuous electrical drive to display information. Cameras with this type of display are usually turned on only for short periods of time to preserve battery life. When the cameras are turned off, the liquid crystal display goes blank. An operator must turn on the camera to determine the status of the camera. These cameras typically incorporate a high voltage supply to drive an electronic flash built into the camera, and utilize cartridges that contain the film in a light tight environment.

Many digital cameras use liquid crystal displays to display a captured image. Displays in these cameras are also nematic liquid crystals displays that can drain an electronic camera power supply in a short period of time.

Many digital cameras also use removable memory cards to store images. There is no way to tell how much capacity remains or what images reside on these memory cards without turning the camera on.

SUMMARY OF THE INVENTION

Accordingly, it is an object of the present invention to provide a convenient way for a viewer to view a display on an image bearing medium whether in the camera or removed from the camera for viewing.

It is another object of the present invention to provide a convenient way to view the display on image bearing medium that presents an indication of camera status to the user.

It is another object of the present invention to provide a camera with a display on the image bearing medium that presents the indication of camera status to the user.

It is another object of the present invention to provide a means for changing the display on the image bearing medium prior to removal from the camera such that the display reflects the status of the image bearing media and not necessarily the camera.

These objects are achieved by a camera having a removable image bearing medium for camera captured images that includes film or a digital memory comprising:

(a) a display disposed relative to the removable image bearing medium so that the display is removable from the camera with the removable image bearing medium, such display displaying images for information related to captured images;

(b) means for actuating the display to provide images of one or more captured images or information related to such one or more captured images; and (c) the display being positioned for viewing by a user.

It is a feature of the present invention that a display is provided on a removable image bearing medium and can be viewed either in the camera or after removal from the camera.

Another feature of the invention that the display itself can be made detachable from the image bearing medium and reused.

BRIEF DESCRIPTION OF THE DRAWINGS

FIG. 1 is a top sectional view of a silver halide camera with a film cartridge with a memory display;

FIG. 2 is a top sectional view of an electronic capture camera with a removable memory card with a memory display;

FIG. 8A is a waveform to drives a memory material to a reflecting, or bright condition;

FIG. 8B is a waveform to drives a memory material to a transmitting, or dark condition;

FIG. 8C is a waveform to drive a memory material to an intermediate condition between transmission and reflection;

DETAILED DESCRIPTION OF THE INVENTION

Figure 3:
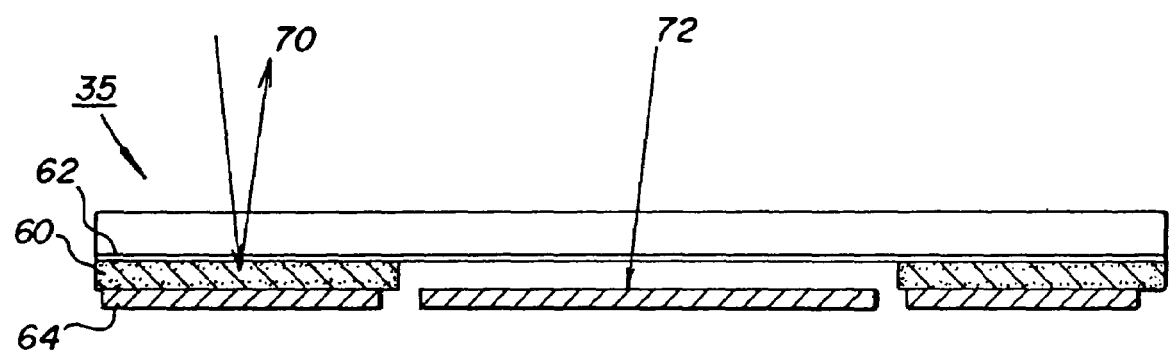
FIG. 3 is a side sectional view of the memory display of FIG. 1.

A top sectional view of a silver halide film camera 10 is shown in FIG. 1. A film cassette 20 with a memory display 37 in camera 10 holds a strip of film 22 that captures images from optic 26. Film 22 is sequentially taken up onto take-up spool 24 to capture a set of images. After image exposure is complete, film 22 is returned to film cassette 20. Camera controller 30 receives commands from an operator and controls the sequential motion of film 22 and optic 26. Camera controller 30 can provide supplemental illumination to a scene by discharging a high voltage pulse through flash tube 42 in a flash unit. Flash tube 42 requires a flash capacitor 40 to store energy for flash tube 42. Flash capacitor 40 typically stores energy in a capacitor having over 50 micro-farads capacitance at over 100 volts.

The status of camera 10 is shown on a display 35 in camera 10. Typically, display 35 shows the number of the current frame of film, the operational mode of flash tube 42, and operating parameters of optic 26. The status of the camera 10 can also be shown on the memory display 37. In more complex cameras, display 35 is a conventional nematic liquid crystal display. Nematic liquid crystal fluids act in conjunction with polarizing filters to act as a shutter to reflect or transmit light. Transmitted light is selectively reflected from a surface behind the display to provide light indicia. The reflected light provides a white indicia. When light is blocked by the polarizing filters, the imager area is dark. Nematic liquid crystals must have a continuous electrical field across the display to display information.

FIG. 2 is a top sectional view of an electronic camera 12. Many of the components operate as in conventional camera 10. Film 22 is replaced by electronic sensor 50. Electronic sensor 50 captures a scene and camera controller 30 stores a captured image in removable memory card 52 with memory display 54. The status of the electronic camera 12 can be shown on the memory display 37. Display 35 in electronic camera 12 displays the status of electronic camera 12, and in certain cases displays images from removable memory card 52. The flash tube 42 is often provided in electronic camera 12 to supply additional light to a scene at the time of image capture. Flash tube 42 requires the flash capacitor 40 to store energy for flash tube 42. Flash capacitor 40 typically stores energy in a capacitor having over 50 micro-farads capacitance at over 100 volts.

FIG. 3 is a diagram of display 35 in accordance with the present invention. Memory material 60 is disposed between a transparent top conductor 62 and a bottom conductor 64. Bottom conductor 64 can be a transparent electrical conductor such as Indium-Tin-Oxide or a light absorbing conductor formed by an oxide of a metal such as platinum or nickel. Memory material 60 can be a chiral doped nematic liquid crystal such as those disclosed in U.S. Pat. No. 5,695,682. Applied fields of various intensity and duration change the condition of chiral doped nematic materials from a reflective to a transmissive condition. In this way, the display 35 is actuated to convey useful information.

The chiral doped nematic liquid crystal materials have the advantage of maintaining a given condition indefinitely after the field is removed. Ambient light striking memory material can be reflected light 70, providing a "light" image or can become absorbed light 72 which provides a "dark" image. The light modulation is effective in two conditions, which will be described in more detail below. Cholesteric liquid crystal materials can be Merck BL112, BL118 or BL126 which are available from EM Industries of Hawthorne, N.Y. In one experiment, two glass plates were coated with transparent Indium-Tin-Oxide (ITO) to form transparent top conductor 62 and bottom conductor 64. A laser beam was used to pattern the ITO coatings and 4 micron spacer beads were applied to one of the plates. The two plates were bonded together, with the spacer beads providing a 4 micron gap between the two plates. Black paint was applied to the back of the display over bottom conductor 64 to absorb light passing through memory material 60. The gap between the plates was filled with E. M. Industries (Hawthorne, N.Y.) chiral nematic fluid BL126 to act as memory material 60. A 3 millisecond pulse at 100 volts across areas on transparent top conductor 62 and bottom conductor 64 would convert the BL126 memory material 60 to a reflective "bright" areas. A 3 millisecond pulse at 40 volts would clear memory material 60 so that incident light was absorbed by the black paint and create "dark" areas. Such a display can be used to display camera status on memory display 37 for conventional camera 10 or display 54 for electronic camera 12. The memory display 37 includes the memory material 60 which is selected to be effective in a first condition for changing the state of the memory material 60 to display an image and effective in a second condition for preventing the display of the image. The memory material 60 is selected so that after displaying the image the memory material 60 continues to display the image after the removal of the applied high voltage. As will be seen shortly when a voltage less than the high voltage is applied to the memory material 60, the memory material 60 is caused to be in its second condition.

Figure 4:
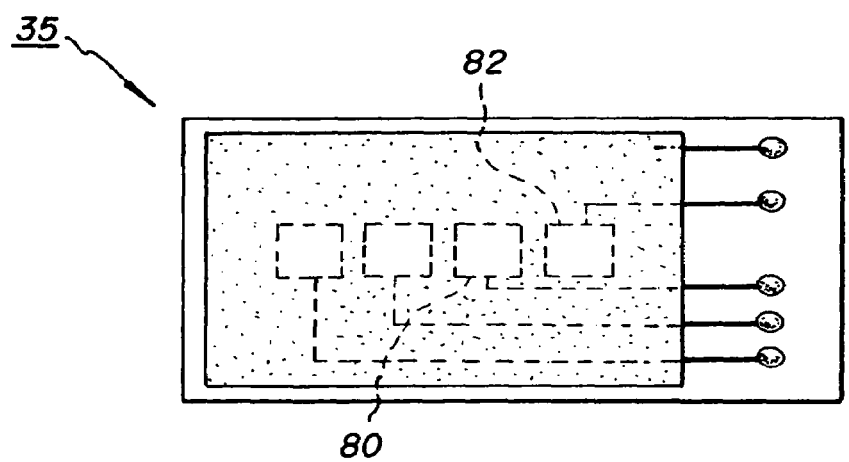
FIG. 4 is a top view of the memory display of FIG. 3.

FIG. 4 shows such display 35 having memory material 60. A reflecting segment 80 has had a 100 volt pulse applied to memory material 60. A transparent segment 82 has received a 40 volt pulse. Transparent segment 82 passes incident light to a light absorbing surface to create a dark. The individual segments retain a given condition indefinitely after being pulsed. A camera with an electronic flash charging unit provides the source of high voltage. As will be discussed in FIG. 5 a camera 10 or 12 with an electronic flash charging unit provides the source of high voltage that can be shut off and the image-bearing medium will continue to have an visible display.

Figure 5:
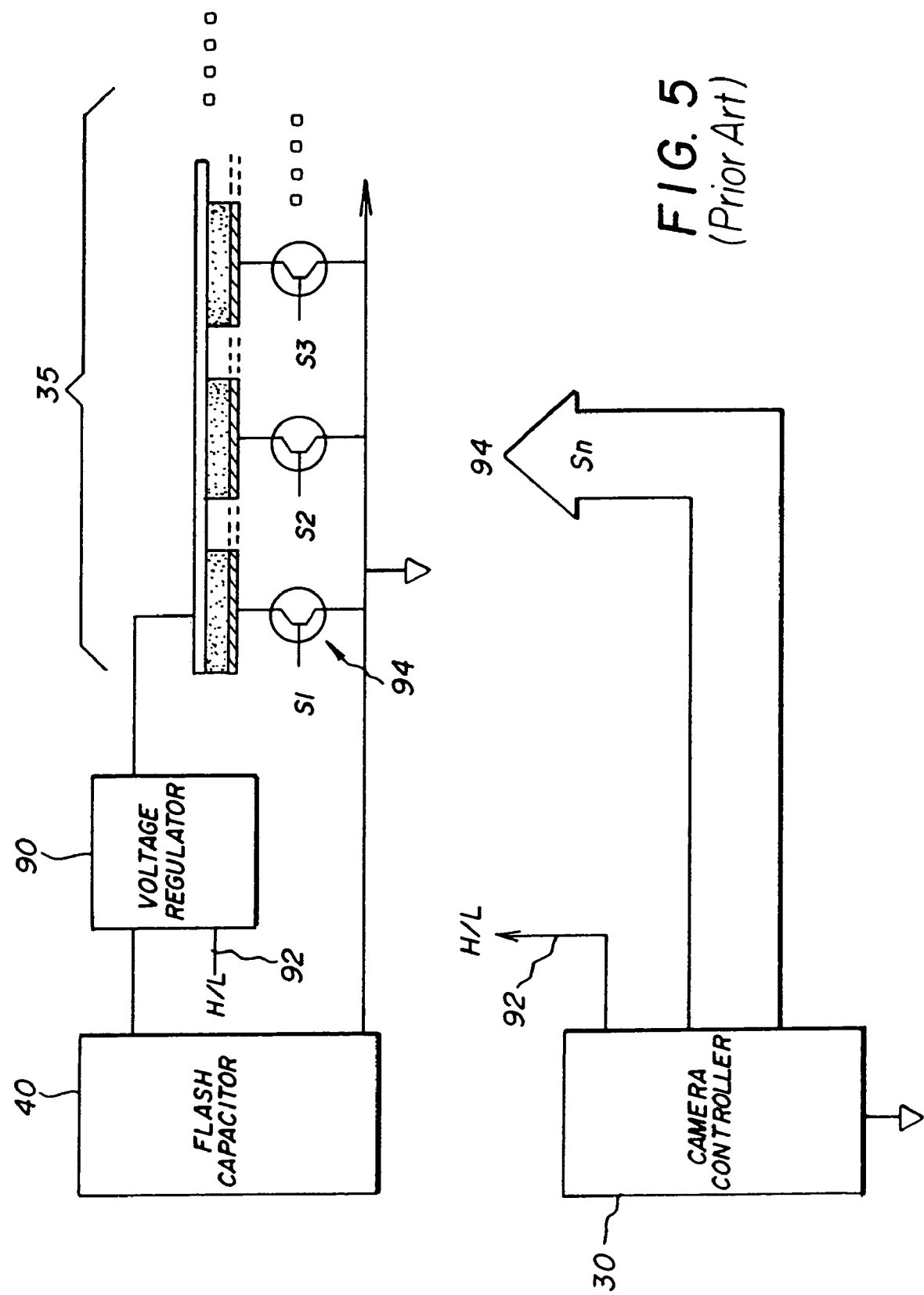
FIG. 5 shows an electrical circuit which drives the display of FIG. 3 by selectively coupling the flash unit high voltage supply to the display.

FIG. 5 is a schematic for driving memory display 37 in conventional camera 10. Flash capacitor 40 is used as a source of high voltage for pulsing memory display 37. Flash capacitor 40 stores power at well over 100 volts. Voltage regulator 90 converts a voltage from flash capacitor 40 to either a high or low voltage. In one case, voltage regulator 90 is resistor network that changes 330 volts on flash capacitor 40 to either 100 or 40 volts in response to high-low voltage select line 92 which is used by camera controller 30 to select a pulse voltage for memory display 37. Using the pre-existing high voltage on flash capacitor 40 eliminates the need for an additional high voltage generating system in conventional camera 10.

Camera controller 30 uses high-low voltage select line 92 to changes the voltage applied to memory display 37. Memory display 37 contains chiral nematic liquid crystal memory material 60 to hold either a reflective or transmissive condition for each segment of memory display 37.

FIG. 8A show the voltage forms applied by camera controller 30 to a segment of memory display 37 to write the segment into the reflective mode. Camera controller 30 sets voltage regulator 90 to a low voltage and pulses all segment switches 94 to clear all the segments with low voltage pulse $P_L$. Voltage regulator 90 is then set to a high voltage, and selected ones of segment drivers 94 are pulsed with a high voltage pulse $P_H$ to convert those segments to the reflective mode.

FIG. 8B is a waveform across a segment that has been kept in the transmissive mode. Because $P_H$ was not applied across that segment, the segment remains in a transmissive, dark condition from $P_L$. After the write pulses $P_L$ and $P_H$ are applied, memory display 37 will continue to display status information indefinitely without the use of additional power. Conventional camera 10 can be de-energized and memory display 37 will continue to display information such as the number of images left on film 22 or dates of exposure of frames on film 22 or other information pertinent to images on film 22. If film camera 10 was a hybrid camera with the capacity to capture electronic images as well as film images, a representation of the at least one image electronically captured could also be displayed on memory display 37 on film cassette 20.

Figure 6A:
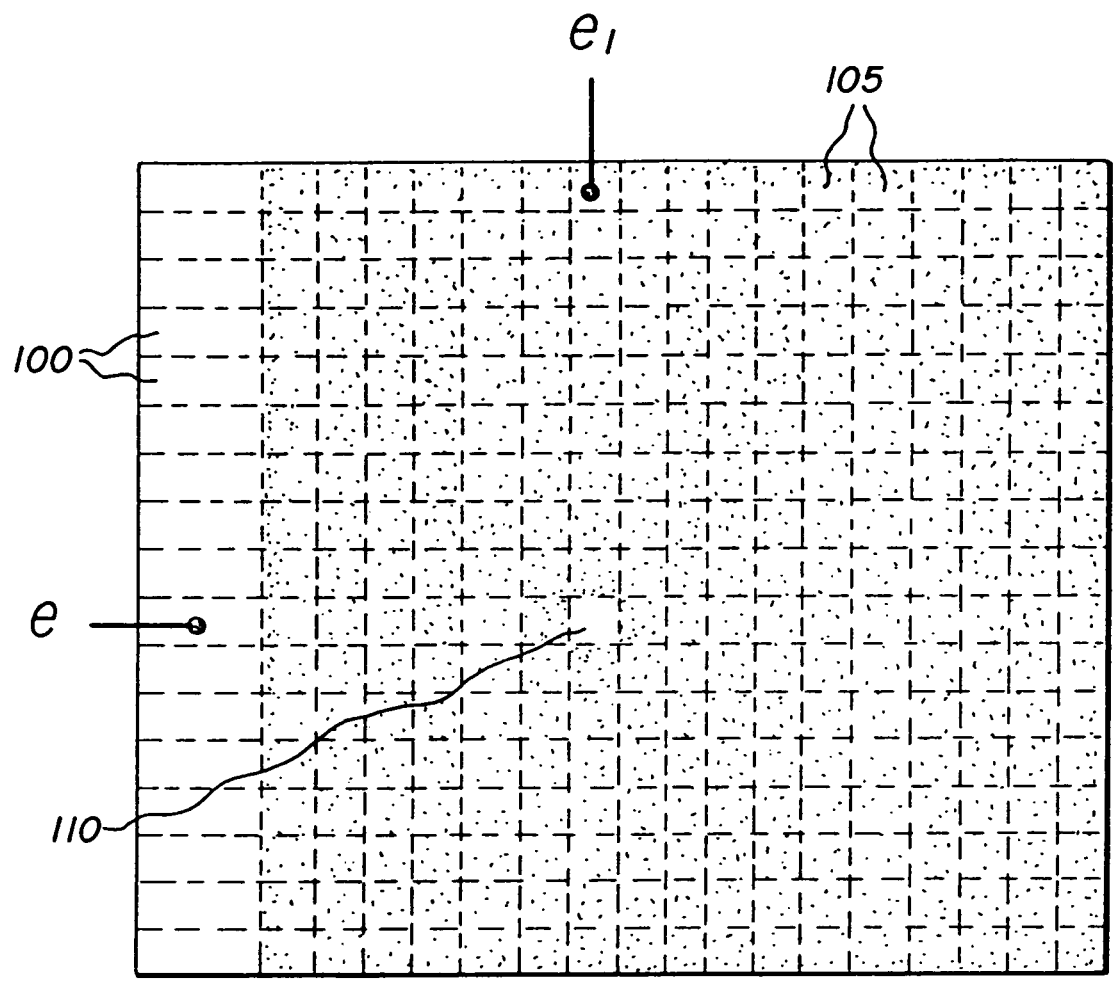
FIG. 6A is a partial top view of the memory display of the electronic capture camera of FIG. 2.
Figure 6B:
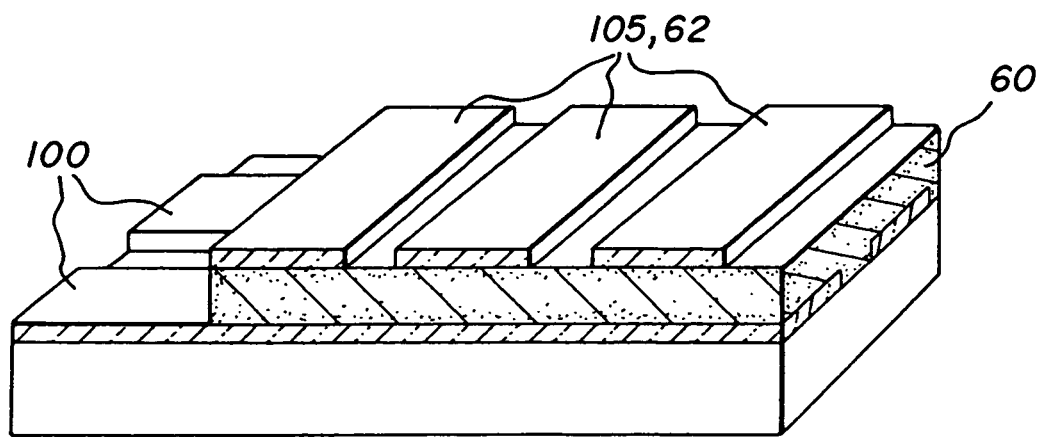
FIG. 6B is a magnified view of the memory display of FIG. 6A.

FIG. 6A is a partial top view and FIG. 6B is a magnified view of display 35 in electronic capture camera 12. A substrate 61 supports a plurality of transparent row traces 100. A second set of transparent traces form column traces 105. These traces provide for electrical conduction to the display 35 and coupled selectively the high voltage in the flash unit and the low voltage to the display as discussed above. The memory material 60 is disposed between row traces 100 and column traces 105. Memory material 60 is a chiral nematic material that can be written into either a reflective or transmissive condition. Chiral nematic materials can be tuned to red green and blue wavelengths of reflection and three color planes can be stacked to create a full color display.

Figure 7:
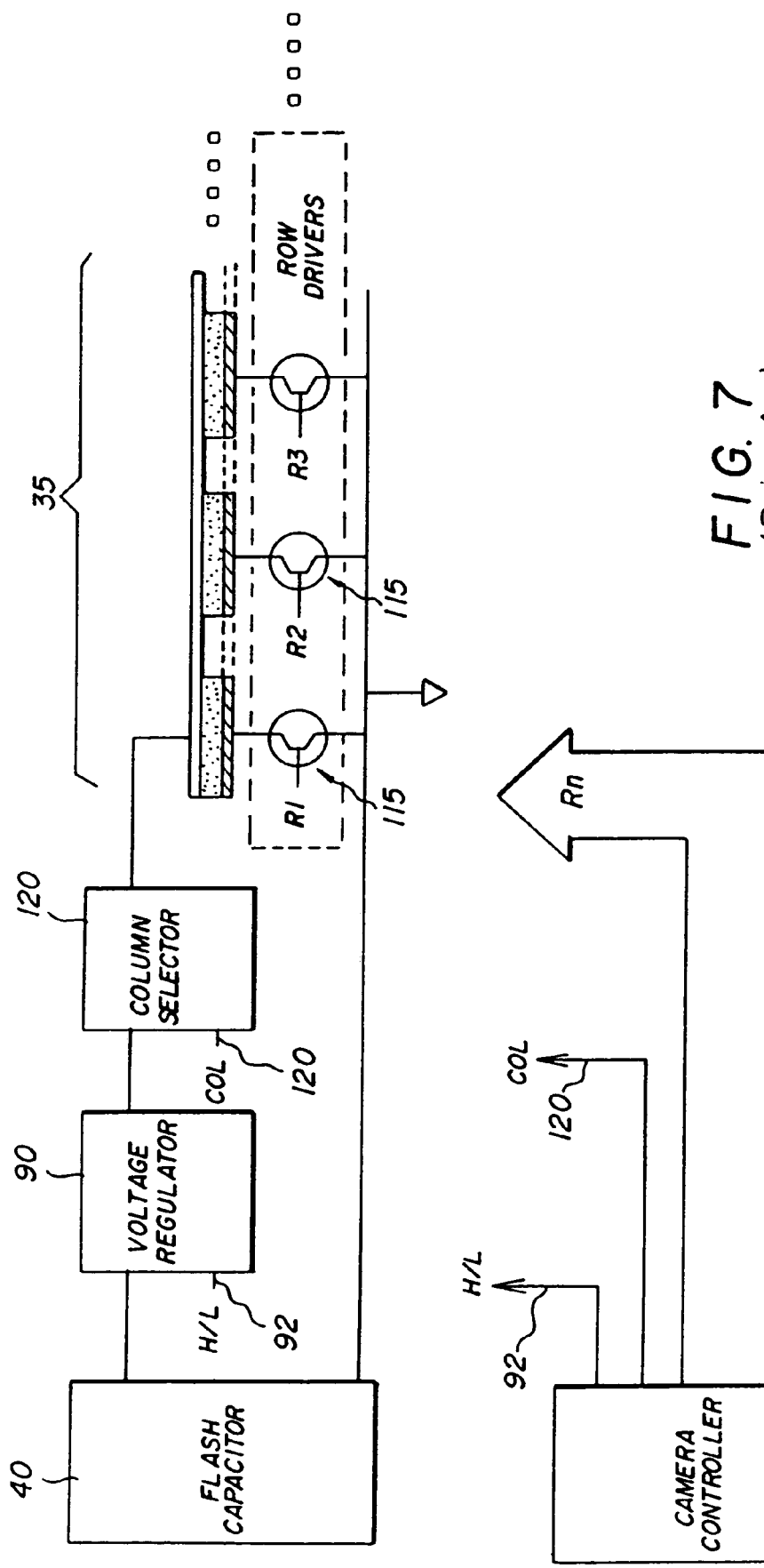
FIG. 7 is an electrical schematic circuit which drives the memory display of FIGS. 6A and 6B.

FIG. 7 is a schematic for driving display 54 in an electronic camera 12. Flash capacitor 40 is used as a source of high voltage for pulses to display 35. Flash capacitor 40 stores power at well over 100 volts. Voltage regulator 90 converts a voltage from flash capacitor 40 to either a high or low voltage. In one case, voltage regulator 90 is resistor network that changes 330 volts on flash capacitor 40 to either 100 or 40 volts in response to high-low voltage select line 92. Using the pre-existing high voltage on flash capacitor 40 eliminates the need for a high voltage generating system in electronic camera 12.

FIG. 8C is the drive signals applied across a single color plane of display 35 when used as to display a color, gray scale image stored in removable memory card 52 using the electrical drive of FIG. 7. Camera controller 30 selects a first column using column selector 120. Camera controller 30 sets voltage regulator 90 to a low voltage, and row drivers 115 write a first clearing pulse $P_L$ to all pixels in the row. Camera controller 30 then sets voltage regulator 90 to a high voltage. Row drivers 115 are energized for various gray level times tg. A chiral nematic material changes condition from the transmissive to the reflective condition progressively over time. By selecting an appropriate drive time tg for each pixel 110, a column of pixels can be written to various degrees of reflection, creating a column of pixels actuated to various gray levels. Camera controller 30 uses to column selector 120 to select the next column of pixels for writing. The process is repeated for each column, and each color plane to create a full-color, gray scale image on display 35. Other driving schemes can be used such as one proposed by Hashimoto et al, "Reflective Color Display Using Cholesteric Liquid Crystals", SID 98 Digest, Article 31.1, 1998, pp. 897–900.

Figure 9:
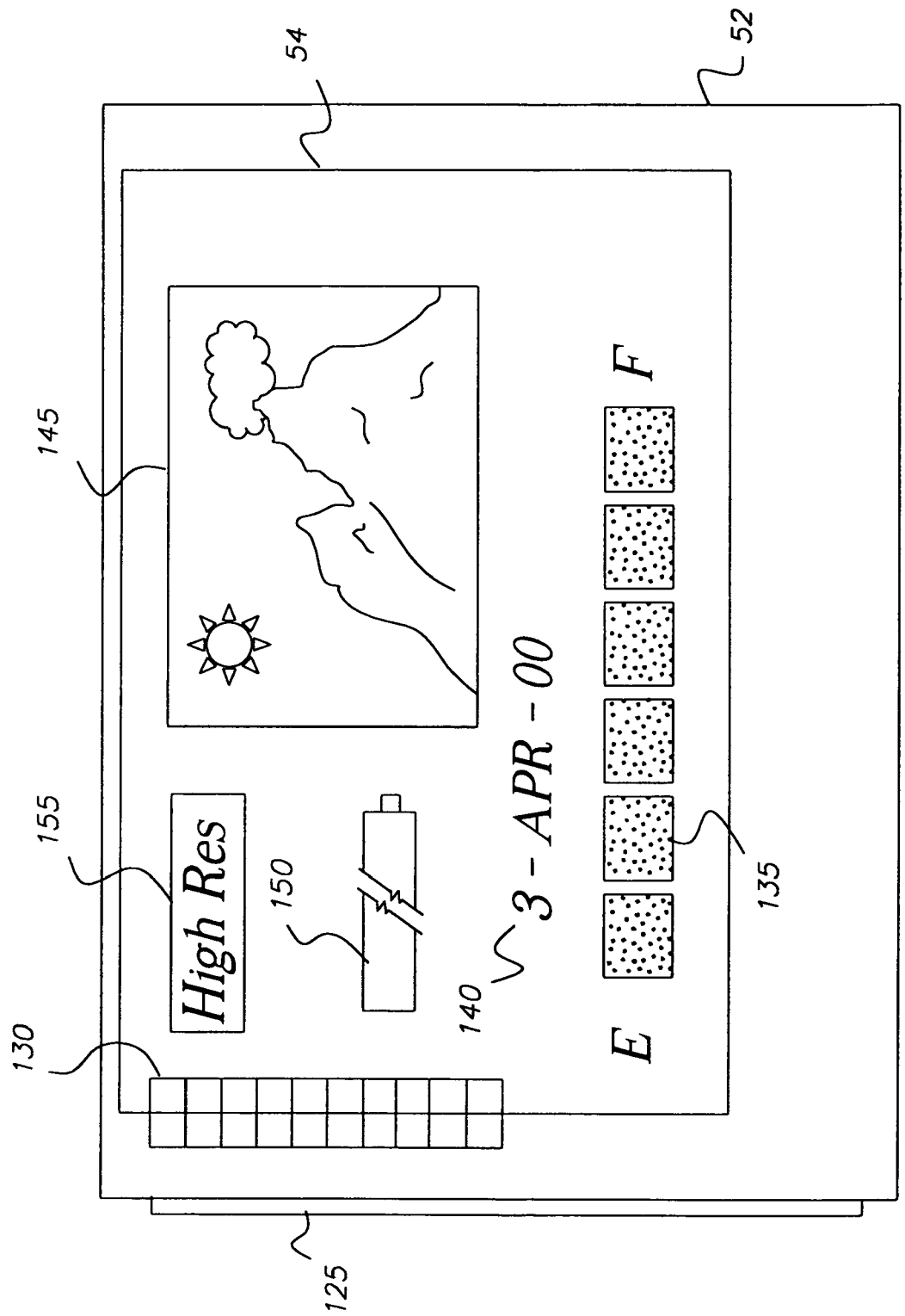
FIG. 9 is a view of a memory card with a memory display.

FIG. 9 is a view of a removable memory card 52 with a memory display 54. Memory card connector 125 mates with the electronic camera 12 to transfer image data for storage as is traditional in electronic cameras. Memory display connector 130 is provided so that the high voltages necessary to update memory display 54 may be applied. One skilled in the art will understand that both the memory card and the memory display can be actuated using a single connector.

Bar indicator 135 is a display that indicates the remaining storage space on the memory card. Time or date display 140 is an indication of the date of capture of at least one of the images stored on the card. Image display 145 is a representation of at least one image file stored on the card. Image display 145 can be a small image that depicts many image files stored on the card, or could be a portion of one image.

Battery status indicator 150 shows an indication of camera battery condition. Electronic camera 12 can access the memory display 54 on removable memory card 52 to indicate this and other conditions of the electronic camera 12. Resolution indicator 155 shows the result of a user selection for resolution and resulting file size. Memory display 54 can be used to this and other selections made by the user.

Figure 10:
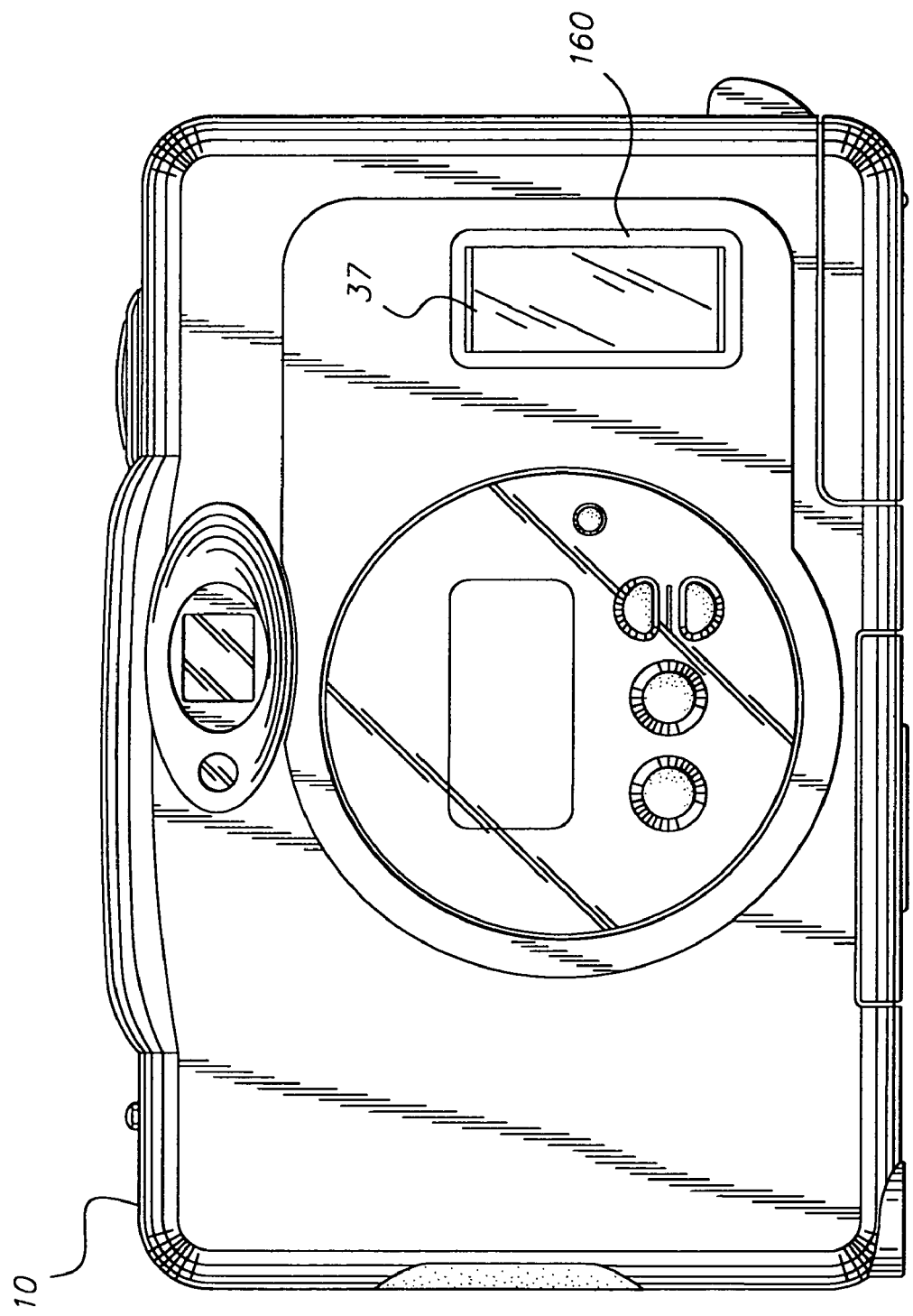
FIG. 10 is a view of a film camera with a visible memory display on the image bearing medium.

FIG. 10 shows a view of a film camera 10 where changeable display 37 is visible through window 160. Note that display 37 is disposed relative to the removable image bearing medium 20 so that display 37 is removable from camera 10 with removable image bearing medium 20. For clarity of illustration the display 35 has been omitted.

Figure 11:
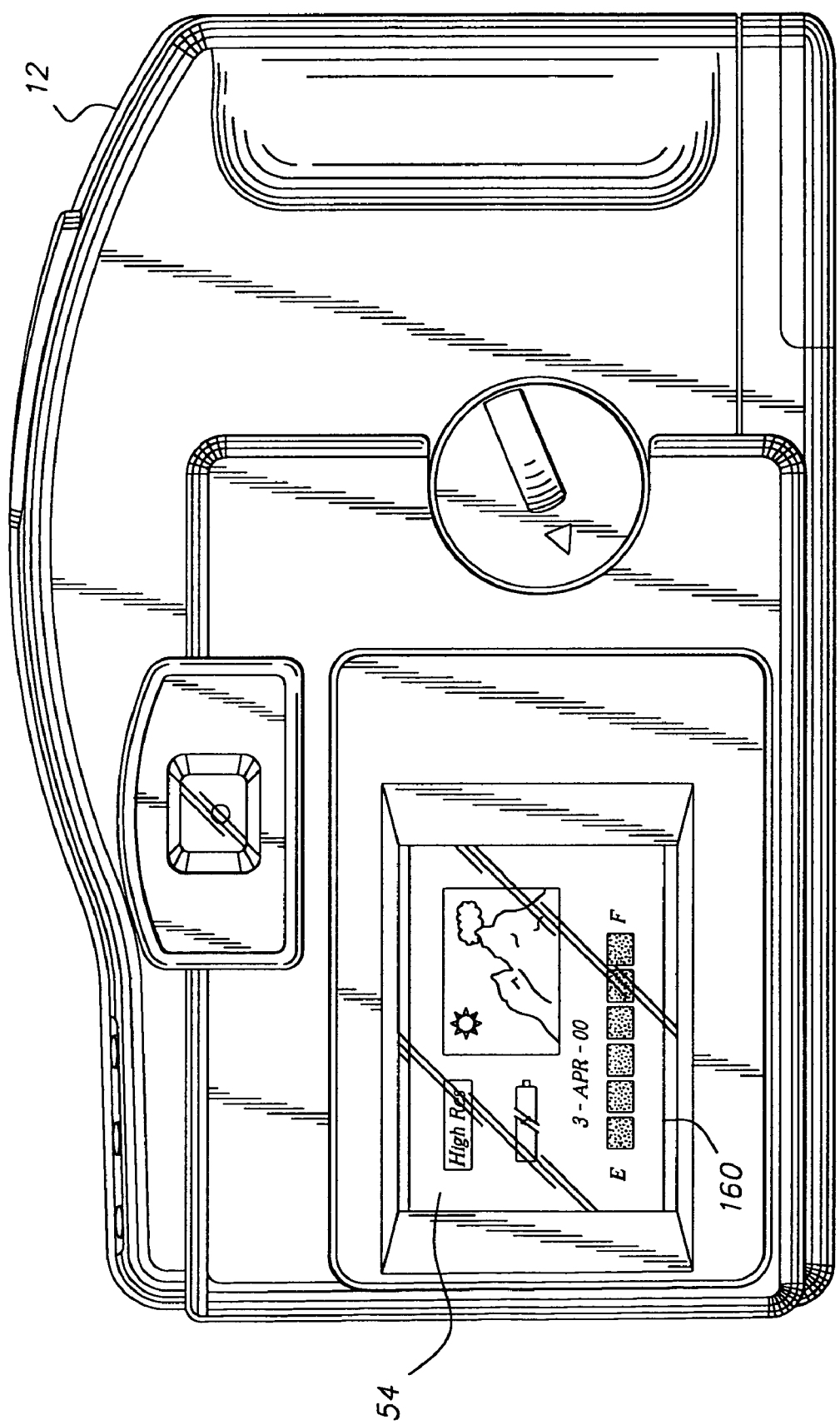
FIG. 11 is a view of an electronic camera with a visible memory display on the image bearing medium.

FIG. 11 shows a view of electronic camera 12 where changeable display 54 is visible through window 160. Note that display 54 is disposed relative to the removable image bearing medium 52 so that display 54 is removable from camera 12 with removable image bearing medium 52. For clarity of illustration the display 35 has been omitted.

When removable memory card 52 is inserted into electronic camera 12, communication is initiated by which an indicia of the capabilities of display 54 are communicated to camera 12. In this way, electronic camera 12 can format signals sent to the display as desired for effective communication to the user. Alternately, if the display is pre-formatted such that certain icons are provided, the communication between electronic camera 12 and removable memory card 52 can establish this fact.

Upon power-down of camera 12 or upon indication of removal of removable memory card 52, electronic camera 12 can change display 54 to indicate only the condition of removable memory card 52 thereby removing all camera status indication prior to removal of the image bearing medium 52. There is little value in displaying the condition of electronic camera 12 if removable memory card 52 is separated from electronic camera 12. Mechanical interlocks or warning lights or sounds can be employed to prevent the user from removing card 52 from electronic camera 12 before the pre-removal writing process is complete.

Figure 12:
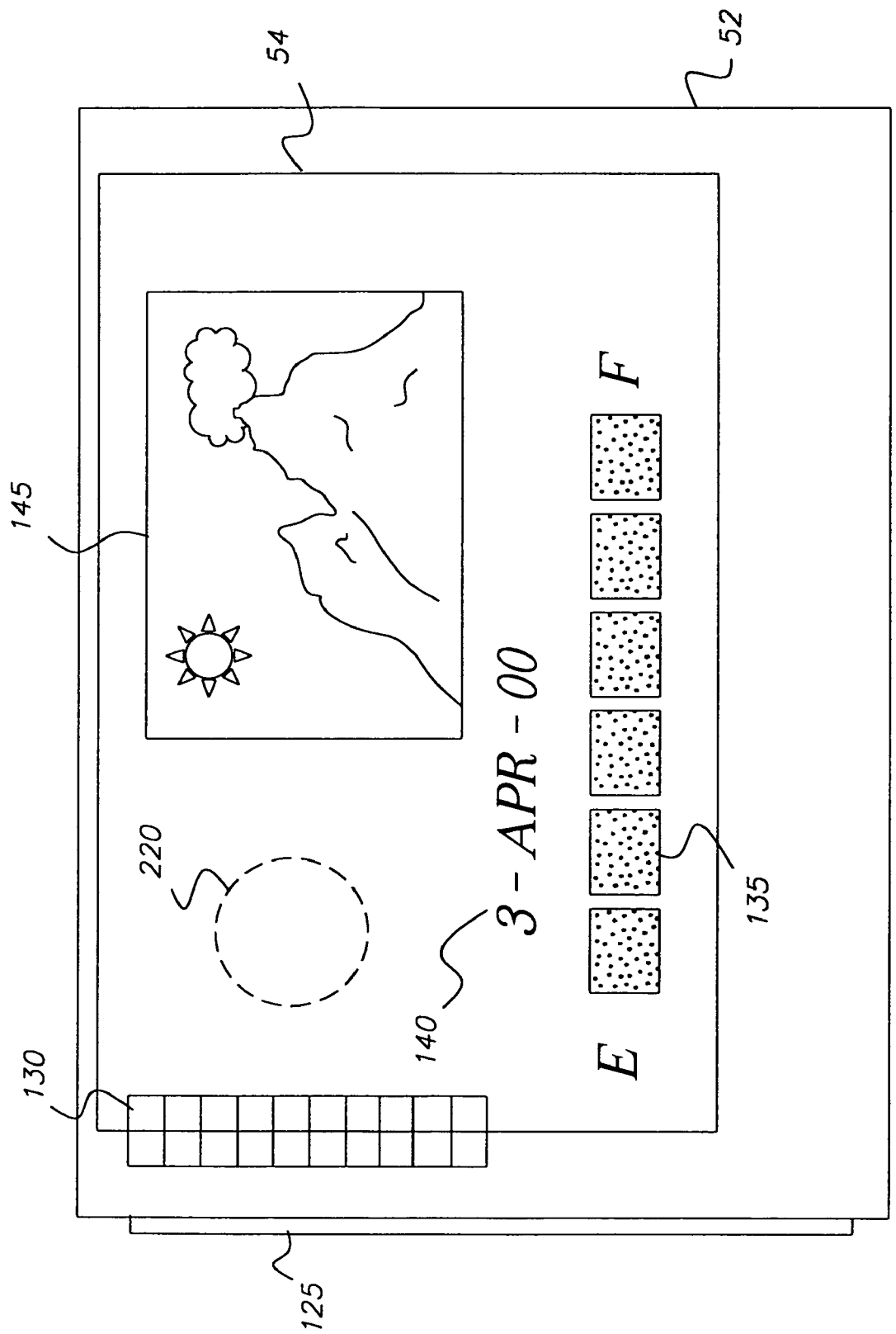
FIG. 12 depicts a memory card which incorporates a detachable display.

Display 54 can be integrally secured to the removable memory card 52. However, it can also be detachable and thus a user can detach it from the removable memory card 52. This feature permits the display 54 to be reusable on different memory cards and can provide significant cost advantages. FIG. 12 shows a clip 200 formed on the removable memory card 52 which permits the display 54 to be attached and removed from the removable memory card 52. An alignment feature 210 facilitates proper location of display 54 on removable memory card 52. Also, if the separable display 54 is not constructed of a memory material such as chiral doped nematic liquid crystals, it can be necessary to include battery 220 which is electrically connected to display 54.

The invention has been described in detail with particular reference to certain preferred embodiments thereof, but it will be understood that variations and modifications can be effected within the spirit and scope of the invention.

| | PARTS LIST |
|---|---|
| 10 | conventional camera |
| 12 | electronic camera |
| 20 | film cassette |
| 22 | film |
| 24 | take-up spool |
| 26 | optic |
| 30 | camera controller |
| 35 | display |
| 37 | memory display |
| 40 | flash capacitor |
| 42 | flash tube |
| 50 | sensor |
| 52 | removable memory card |
| 54 | memory display |
| 60 | memory material |
| 61 | substrate |
| 62 | transparent top conductor |
| 64 | bottom conductor |
| 70 | reflected light |
| 72 | absorbed light |
| 80 | reflecting segment |
| 82 | transmitting segment |

-continued

PARTS LIST

| | |
|---|---|
| 90 | voltage regulator |
| 92 | high-low voltage select line |
| 94 | segment switch |
| 100 | row traces |
| 105 | column traces |
| 110 | pixel |
| 115 | row drivers |
| 120 | column selector |
| 125 | memory card connector |
| 130 | memory display connector |
| 135 | bar indicator |
| 140 | time or date indicator |
| 145 | image display area |
| 150 | battery status indicator |
| 155 | resolution indicator |
| 160 | window |
| 200 | clip |
| 210 | feature |
| 220 | battery |

What is claimed is:

1. A camera having a removable image bearing medium for camera captured images that includes film or a digital memory comprising:

(a) a power source disposed in the camera;

(b) a display disposed relative to the removable image bearing medium so that the display is removable from the camera with the removable image bearing medium, wherein the display receives power from the power source when the display is in the camera and the display is disconnected from the power source when it is removed from the camera, and wherein the display responds to the applied power source when in the camera for displaying image(s) or information related to captured image(s) and continues to display such image(s) or information related to captured image(s) after removal from the camera and disconnection from the power source so that no power is applied to the display; and (c) means for actuating the display and applying the power source to provide images of one or more captured images or information related to such one or more captured images wherein neither the display nor the removable image bearing medium includes a power source to provide power to the display when the display is removed from the camera.

2. The camera of claim 1 wherein the image bearing medium includes a removable memory card having the digital memory.

3. The camera of claim 1 wherein the image captured related information provides a time or date.

4. The camera of claim 1 wherein the image bearing medium displays at least one indication of the status of the camera.

5. The camera of claim 1 wherein the image bearing medium communicates an indicia of the capabilities of the display to the camera.

6. The camera of claim 4 wherein the camera actuates the display on the image bearing medium to remove camera status indications prior to removal of the image bearing medium from the camera.

7. The camera of claim 1 wherein the display is removable from the removable image bearing medium.

8. The camera of claim 1 wherein the display includes a bar indicator that indicates an amount of storage space available in the removable image bearing medium to store the camera captured images.

9. The camera of claim 1 wherein the display includes memory material comprising chiral doped nematic liquid crystal.

10. The camera of claim 6 wherein the camera status indication includes camera battery status.

* * * * *